United States Patent [19]

Stöckel et al.

[11] 4,019,876
[45] Apr. 26, 1977

[54] ELECTRICAL CONTACT ELEMENT AND METHOD OF PRODUCING THE SAME

[75] Inventors: Dieter Stöckel, Pforzheim; Hans-Jürgen Oberg, Keltern-Dietlingen, both of Germany

[73] Assignee: G. Rau, Pforzheim, Germany

[22] Filed: Apr. 19, 1976

[21] Appl. No.: 678,383

[30] Foreign Application Priority Data

Apr. 19, 1975 Germany .......................... 2517347

[52] U.S. Cl. .............................. 428/621; 228/110; 428/650; 428/929
[51] Int. Cl.[2] .................. B32B 15/20; B23K 21/02
[58] Field of Search .............. 29/199, 195 M, 194, 29/197; 75/173 A; 228/110, 111

[56] References Cited
UNITED STATES PATENTS

| 3,574,570 | 4/1971 | Gwyn | 29/199 X |
|---|---|---|---|
| 3,666,428 | 5/1972 | Haarbye | 29/195 |
| 3,674,446 | 7/1972 | Haarbye et al. | 29/195 |
| 3,775,067 | 11/1973 | Backstrom | 29/195 |
| 3,926,357 | 12/1975 | Matrisian | 228/110 |
| 3,941,299 | 3/1976 | Godfrey | 29/199 X |

Primary Examiner—L. Dewayne Rutledge
Assistant Examiner—E. L. Weise
Attorney, Agent, or Firm—Wenderoth, Lind & Ponack

[57] ABSTRACT

The contact element is produced by ultrasonically welding one or more contact pieces onto a carrier, an intermediate layer, for example of aluminium foil, being interposed between the contact piece and the carrier prior to such welding in order to assist in the welding of contact pieces made of material which would otherwise be difficult to weld.

9 Claims, 1 Drawing Figure

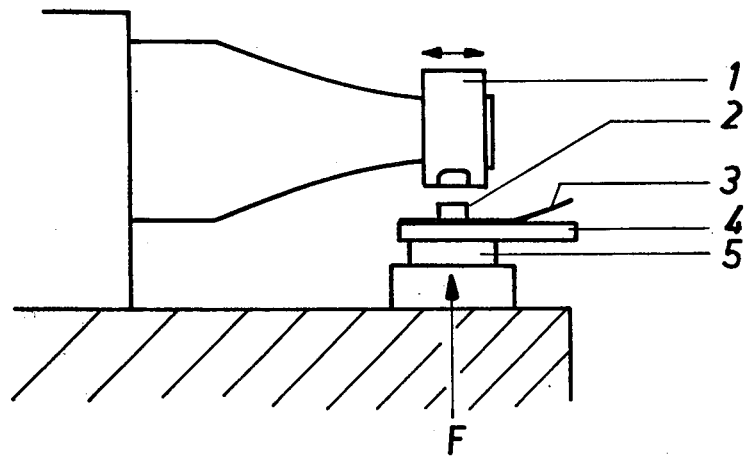

ELECTRICAL CONTACT ELEMENT AND METHOD OF PRODUCING THE SAME

This invention relates to an electrical contact element of the type in which at least one contact piece is joined to a carrier by ultrasonic welding. A method for producing such contact elements is also described.

In order to avoid welding during electrical switching operations of the contact elements, it is desirable that the contact pieces are produced from contact materials which do not weld easily. If such contact elements are used, difficulty can be experienced when joining the contact pieces to the carrier by brazing or soldering, as well as welding. This applies particularly to the composite materials based on silver which are often used as contact materials and which contain non-metallic components, for example, AgCdO, $AgSnO_2$ AgMgO, or AgC. These contact materials may take the form of non-metallic particles, for example of cadmium oxide, tin oxide or magnesium oxide, which are embedded in a silver matrix. In some cases, the non-metallic components take the form of fibre-like striations lying at right-angles to the eventual contact surface of the contact piece.

For the purpose of securing contact pieces of material that is difficult to weld to a carrier, it is known to apply material, that can be readily welded, soldered or brazed, to the rear face i.e. that face which faces the carrier of a contact piece. Intermediate layers of this kinde can be produced by various known methods. In the case of internally oxidized material for example, the layer of weldable, solderable or brazable material can be formed by oxidation on the rear face, or by the prior application, by cladding, of a layer of silver to the rear face. It is also possible, using powder-metallurgy techniques, to provide an intermediate layer that can be welded, soldered or brazed, by multi-layer pressing or by shaping multi-layer blocks. The production of such contact pieces, having rear faces that can be readily welded, soldered or brazed, involves considerable expense and complicated operations.

It is also known to bond difficult-to-weld contact materials directly to a carrier by ultrasonic welding. The ultrasonic welding process offers advantages as regards the low thermal load to which the contact material is subjected, but in many cases it does not provide adequate shear strength when direct bonding is used. Certain advantageous material combinations, e.g. AgCdO and brass, are incapable of eing sufficiently firmly bonded by ultrasonic welding.

One ultrasonic welding method includes a system in which aluminium current-carriers are provided with contacts. The connection areas are first covered with a contact foil by ultrasonic spot-welding or ultrasonic roller-welding. A soldered, brazed, screwed or clip connection is then provided at the areas previously prepared in this manner. Composite foils of copper and aluminium, or gold or silver foils can be used as the contact foils. However, the joining of contact pieces to the carrier, previously clad using the ultrasonic welding method, is complicated and is costly to carry out on a mass-production basis.

The present invention seeks to provide a contact element in which at least one contact piece is joined by ultrasonic welding to a carrier, an efficient high-strength connection being effected between the contact piece and the carrier.

In accordance with one aspect of the invention, there is provided an electrical contact element comprising at least one contact piece joined to a carrier by means of ultrasonic welding, and an intermediate layer of readily cold-weldable metal material which is inserted between the contact piece and the carrier prior to ultrasonic welding.

This ultrasonic welding method provides a surprisingly strong joint between the contact piece and the carrier. The intermediate layer may be made either of a pure metal, preferably aluminium but optionally silver, copper or titanium, or of a metal alloy having similar properties, for example, an aluminium-copper alloy. It has been found that, with the usual dimensions of contact elements, the thickness of the intermediate layer should advantageously be less than 1 mm, and preferably less than 0.2 mm.

In a preferred embodiment of the contact element the contact piece is made of silver-cadmium oxide, the carrier is made of brass and the intermediate layer is made of aluminium.

In accordance with a further aspect of the invention, there is provided a method of producing the contact element according to the first mentioned aspect of the invention, said method comprising inserting an intermediate layer in the form of a metal foil between the or each contact piece and the carrier, and carrying out ultrasonic welding under pressure.

Preferably the metal foil is inserted loosely between the contact piece and the carrier. Preferably also, the or each contact piece is placed on a cut piece of foil that is larger than the contact piece. Thence, during ultrasonic welding, a piece corresponding to the size of the contact piece is separated from the foil, the unrequired foil being removed.

The thickness of the foil is in the order of magnitude of the thickness of the intermediate layer, i.e. advantageously below 1 mm and preferably below 0.2 mm.

Because of the effect of high pressure and frictional movement during ultrasonic welding, a piece of metal foil whose size accurately matches the size of the area of contact between the or each contact piece and the foil, is cut out, enabling a superfluous foil to be removed in a particularly simple manner. The foil may expediently consist of cut pieces corresponding to the size of the area over which the joint is to be made.

It is possible to adapt the method of this invention to continuous production by continuously feeding strips of carrier and foil together to a welding machine, placing contact pieces on the foil and ultrasonically welding them one at a time, and then removing superfluous foil from the strip of carrier. Furthermore, it would also be possible to continuously feed the material of the contact piece in wire or strip form. Using this method, it is possible to produce a contact element wherein a joint having high shear strength is formed between an AgCdO contact piece and a brass carrier by using an intermediate layer consisting of aluminium foil. The contact elements exhibit advantageous properties in many applications. The contact elements can be manufactured economically as a mass-produced article and they permit the use of contact materials which are difficult to weld. Since the parts to be joined are not heated up to any great extent during ultrasonic welding, the frequently desired property of high mechanical strength of the carrier and contact piece are retained.

EXAMPLE

A small contact piece in the form of a plate of AgCdO, in which non-metallic components of cadmium oxide were contained in a silver matrix material, had a diameter of 4.5 mm and a thickness of 1.5 mm. This contact piece was joined by ultrasonic welding to a carrier consisting of a brass strip, 8 mm wide and 0.7 mm thick, after interposing a 0.1 mm - thick foil of pure aluminium between the contact piece and the carrier.

The capacity of the ultrasonic vibrator was 1200 W, and its frequency 20 kHz. During the welding process a pressure of approximately 75 kp was applied. The welding time was 1.5 sec. During welding, the unused part of the aluminium foil became detached at the edge of the area over which the joint was made and was removed.

The shear strength of the welded joint was approximately $80 N/mm^2$. An attempt to form a joint directly between the small AgCdO contact plate and the brass carrier by ultrasonic welding was unsuccessful, no adhesion at all being achieved.

The accompanying drawing is a diagrammatical side elevation of an ultrasonic welding machine suitable for manufacturing the electrical contact elements of the present invention. The drawing also illustrates the contact element of the present invention prior to welding. The machine comprises an ultrasonic vibrator 1, whose main direction of vibration is indicatd by the vertical arrow F. The contact element comprises a number of small contact pieces in the form of plates 2 which are joined one at a time to a brass carrier strip 4, an intermediate layer 3 of readily cold-weldable material in the form of aluminium foil being interposed between each plate and the strip. The necessary welding pressure is applied through an anvil 5. The small contact plates 2 pass from a supply bin by way of a suitable feed chute, (not shown), onto the upper surface of the aluminium foil. The direction of feed of the aluminium foil 3 and of the carrier 4 is indicated by a double ended arrow.

We claim:

1. An electrical contact element comprising at least one contact piece having a contact surface for making selective electrical connection with a corresponding contact surface of a contact piece on another contact element, a carrier for supporting the or each contact piece and to which the or each contact piece is joined by means of ultrasonic welding, and an intermediate layer of readily cold-weldable metal material which is inserted between the contact piece and the carrier prior to the ultrasonic welding of the or each contact piece to the carrier.

2. A contact element according to claim 1 wherein the thickness of the intermediate layer is less than 1 mm.

3. A contact element according to claim 2 wherein the thickness of the intermediate layer is less than 0.2 mm.

4. A contact element according to claim 1 wherein the major component of the intermediate layer is aluminium.

5. A contact element according to claim 4 wherein the contact piece is made of silver-cadmium oxide and the carrier is made of brass.

6. A method of producing an electrical contact element according to claim 1, said method comprising inserting an intermediate layer in the form of a metal foil between the or each contact piece and the carrier, and carrying out said ultrasonic welding under pressure.

7. A method according to claim 6 wherein the metal foil is inserted loosely between the or each contact piece and the carrier.

8. A method according to claim 7 including placing the or each contact piece on a piece of metal foil which is larger than the contact piece, separating the required foil from the piece of foil during ultrasonic welding, and removing the unrequired foil.

9. A method according to claim 8 including continuously feeding strips of carrier and metal foil together to a welding machine, placing each contact piece on the metal foil, ultrasonically welding the contact pieces one at a time to the metal foil, and removing the superfluous foil from the strip of carrier.

* * * * *